US006771761B1

(12) United States Patent
LaPierre

(10) Patent No.: US 6,771,761 B1
(45) Date of Patent: Aug. 3, 2004

(54) SYSTEM AND METHOD FOR CALLER-SELECTABLE CALL ROUTING FROM A SINGLE TELEPHONE NUMBER

(75) Inventor: Steven R. LaPierre, Union City, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 09/473,674

(22) Filed: Dec. 29, 1999

(51) Int. Cl.⁷ ............................................... H04M 3/42
(52) U.S. Cl. ............................ 379/211.02; 379/207.11
(58) Field of Search ........................ 379/93.09, 207.02, 379/207.11, 211.01, 211.02, 196, 197, 198, 199

(56) References Cited

U.S. PATENT DOCUMENTS

| | | | |
|---|---|---|---|
| 4,277,649 A | 7/1981 | Sheinbein | 379/211.02 |
| 4,313,035 A | 1/1982 | Jordan et al. | 379/211.02 |
| 4,769,834 A | 9/1988 | Billinger et al. | 379/115.01 |
| 5,018,191 A * | 5/1991 | Catron et al. | 379/100.09 |
| 5,029,196 A | 7/1991 | Morganstein | 379/88.27 |
| 5,062,133 A | 10/1991 | Melrose | 379/93.11 |
| 5,200,994 A | 4/1993 | Sasano et al. | 379/142.06 |
| 5,200,995 A | 4/1993 | Gaukel et al. | 379/200 |
| 5,206,900 A | 4/1993 | Callele | 379/142.06 |
| 5,276,731 A | 1/1994 | Arbel et al. | 379/211.02 |
| 5,301,246 A | 4/1994 | Archibald et al. | 379/142.06 |
| 5,329,578 A * | 7/1994 | Brennan et al. | 379/196 |
| 5,343,517 A | 8/1994 | Bogart et al. | 379/219 |
| 5,357,558 A | 10/1994 | Yoshikawa | 455/463 |
| 5,392,342 A | 2/1995 | Rosenthal | 379/211.03 |
| 5,408,528 A * | 4/1995 | Carlson et al. | 379/211.02 |
| 5,425,089 A | 6/1995 | Chan et al. | 379/183 |
| 5,430,791 A | 7/1995 | Feit et al. | 379/88.01 |
| 5,438,568 A | 8/1995 | Weisser, Jr. | 370/389 |
| 5,440,620 A | 8/1995 | Slusky | 379/100.07 |
| 5,465,295 A | 11/1995 | Furman | 379/221.14 |
| 5,487,111 A | 1/1996 | Slusky | 379/211.03 |
| 5,499,600 A | 3/1996 | Okuno et al. | 117/68 |
| 5,548,636 A | 8/1996 | Bannister et al. | 379/390.01 |
| 5,592,541 A | 1/1997 | Fleischer, III et al. | 379/211.02 |
| 5,600,704 A | 2/1997 | Ahlberg et al. | 455/445 |
| 5,706,339 A | 1/1998 | Eisdorfer et al. | 379/211.03 |

(List continued on next page.)

FOREIGN PATENT DOCUMENTS

| | | |
|---|---|---|
| EP | 0726 669 A2 | 1/1996 |
| WO | WO 91/03137 | 3/1990 |
| WO | WO 9107041 | 5/1991 |
| WO | WO 91/07838 | 5/1991 |
| WO | WO 91/11874 | 8/1991 |
| WO | WO 9326132 | 12/1993 |
| WO | WO 9406254 | 3/1994 |

Primary Examiner—Ahmad F. Matar
Assistant Examiner—Quynh H. Nguyen
(74) Attorney, Agent, or Firm—Cantor Colburn LLP

(57) ABSTRACT

The present invention is directed to a system and method for routing a call to an alternate destination associated with a subscriber of a universal number service, based upon the selection of the calling party. For example, the subscriber may combine access to multiple residential and business telephone numbers via a single universal number. In response to a caller dialing the universal number, the controlling service control point determines whether the subscriber associated with the dialed number has signed up for the universal number service. Upon that determination, the service control point instructs the calling party to select one of the alternate destinations associated with the subscriber. For example, the list of alternate destinations may comprise pagers, cellular telephones, facsimile machines, secondary business or residential telephones, modems, and the like. In response to receiving the calling party's input, the service control point obtains the routing information associated with the chosen destination and instructs the controlling service switching point to route the call to the selected destination.

19 Claims, 3 Drawing Sheets

U.S. PATENT DOCUMENTS

| | | | |
|---|---|---|---|
| 5,724,409 A | 3/1998 | Malik et al. | 379/211.02 |
| 5,724,411 A | 3/1998 | Eisdorfer et al. | 379/93.23 |
| 5,764,747 A | 6/1998 | Yue et al. | 379/211.03 |
| 5,802,160 A * | 9/1998 | Kugell et al. | 370/261 |
| 5,812,639 A * | 9/1998 | Bartholomew et al. | 370/352 |
| 5,896,448 A | 4/1999 | Holt | 379/211.03 |
| 5,905,789 A | 5/1999 | Will | 379/211.03 |
| 5,917,891 A | 6/1999 | Will | 379/88.03 |
| 5,978,450 A | 11/1999 | McAllister et al. | 379/88.02 |
| 5,978,451 A * | 11/1999 | Swan et al. | 379/88.24 |
| 6,104,799 A | 8/2000 | Jain et al. | 379/211.01 |

* cited by examiner

SYSTEM AND METHOD FOR CALLER-SELECTABLE CALL ROUTING FROM A SINGLE TELEPHONE NUMBER

TECHNICAL FIELD

This invention relates generally to systems providing call routing, and more particularly to caller-selected access to multiple telephone numbers and/or devices associated with a subscriber via a single telephone number.

BACKGROUND OF THE INVENTION

Today, telephone subscribers often use multiple telephone numbers for both personal and business purposes. For example, many people today have different telephone numbers for their residence, office, facsimile machine, cellular telephone, pager, and voicemail. With so many different telephone numbers, it is no wonder that people often have to call several different numbers before reaching their desired party.

Moreover, even if the called party is physically at the location called, the particular telephone number may be busy due to extended voice or data connections. In some cases, the calling party may wish to contact the subscriber on a different line; for example, the caller may merely wish to send a facsimile or electronic mail to the subscriber. The calling party, however, may not know or may have forgotten or misplaced the number to the desired line. For these and other reasons, it is desirable to have a service where the caller can ring alternate destinations.

One such prior art service that attempts to provide easier access to a subscriber is known as call forwarding. Standard call forwarding increases communication mobility and flexibility by enabling a subscriber to forward telephone calls to any secondary destination that can be accessed from the central office via the Publicly Switched Telephone Network ("PSTN"). Such destinations include different twisted pair lines, cellular lines, pagers, and other media. Another feature of some call-forwarding services permits the subscriber to remotely forward calls from the caller's primary destination to an alternate destination. With this feature, the subscriber can forward incoming calls while located at a remote location. The subscriber need not be present at the primary destination to initiate the forwarding process.

Call forwarding, however, is an example of a service that permits an incoming call to ring to a secondary destination only at the subscriber's direction. If the subscriber fails to initiate the routing of incoming calls to a secondary destination, the calling party may have no further options. In addition, although call forwarding can link together multiple destinations, the calling party must wait for each secondary destination to ring and be forwarded. Moreover, calls directed initially to a telephone or pager are generally not forwarded to devices such as facsimile machines or modems.

Therefore, there is a need for a method of quickly routing a call to one of a plurality of lines associated with a subscriber based upon a calling party's input. In addition, there is a need for user-selectable routing of calls to devices such as facsimile machines and modems.

SUMMARY OF THE INVENTION

The present invention meets the needs described above by providing a method and system for routing a call dialed to a particular telephone number to an alternate destination associated with the subscriber of that telephone number. The caller may select routing the call to any of the lines or devices made available to the caller by the subscriber. Such devices may include landline and cellular telephones, paging devices, facsimile machines, modems, and other similar devices.

Briefly described, a subscriber may register for a universal number service to obtain a universal number that can be linked to alternate destinations associated with the subscriber. For example, the subscriber may wish to give calling parties access to multiple residential and business telephone numbers without having to provide each telephone number to each calling party. Thus, the subscriber may combine access to these and other select destinations via a single universal number. A calling party may then dial the universal number and select from the alternate destinations. associated with the subscriber of the service.

More particularly described, a calling party dials a universal number, which may comprise a public feature code accompanied by a standard seven or ten digit directory number. The controlling service control point ("SCP") determines whether the subscriber associated with the dialed directory number has signed up for the universal number service. If so, the SCP also determines what alternate destinations are associated with the universal number. The SCP then instructs the calling party to select one of the alternate destinations associated with the universal number. For example, the list of alternate destinations may comprise pagers, cellular telephones, facsimile machines, secondary business or residential telephones, modems, and the like. In response to receiving the calling party's input, the SCP obtains the routing information associated with the chosen destination and instructs the controlling service switching point ("SSP") to route the call to the selected destination.

These and other aspects, features and advantages of the present invention may be more clearly understood and appreciated from a review of the following detailed description of the disclosed embodiments and by reference to the appended drawings and claims.

DETAILED DESCRIPTION OF THE INVENTION

The present invention is directed to a system and method for routing a call dialed to a particular telephone number to one of a plurality of lines and devices associated with the subscriber of that telephone number. The calling party routes the call to any of the lines or devices made available by the subscriber. Such devices may include landline and cellular telephones, paging devices, facsimile machines, electronic mail devices, and the like.

Preferred Operating Environment

Figure 1:
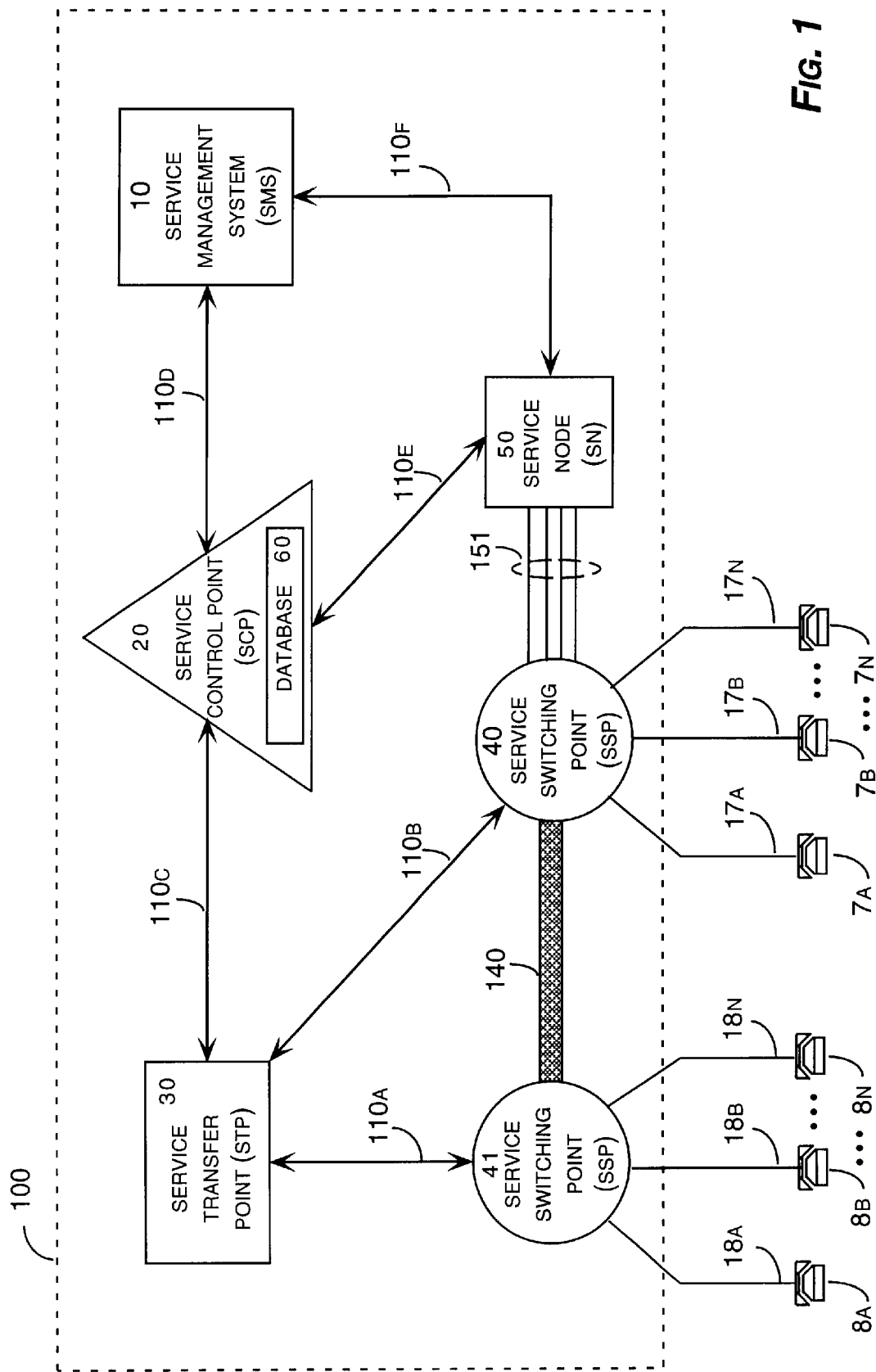
FIG. 1 is a block diagram of an intelligent switched telecommunications network illustrating an exemplary operating environment for an embodiment of the present invention.

FIG. 1 is a functional block diagram of an intelligent switched telecommunications network for use in connection with the exemplary embodiments of the present invention. FIG. 1 illustrates a portion of a public switched telecommunications network (not shown) including an Advanced Intelligent Network ("AIN") 100 of a typical local exchange carrier ("LEC"). The AIN 100, which is well known to those skilled in the art, is the operating environment of the preferred embodiments of the present invention. The AIN is described in the commonly owned patent to Weisser, Jr., U.S. Pat. No. 5,438,568, which is incorporated by reference.

The AIN 100 includes a plurality of central office switches with some of the central office switches equipped with service switching points ("SSPs"). An SSP (e.g., a 5ESS, DMS, or 1AESS type central office switch) is the AIN component of a typical electronic central office switch used by a local exchange carrier. The terms "SSP" and "switch" are used interchangeably to refer to a telecommunications switch for connecting voice channel circuits, including voice channel lines, commonly designated as 17 and 18.

Each SSP in the AIN 100 "services," or serves, as an originating switch for a number of subscriber lines. Generally, an originating switch is directly connected with the subscriber lines serviced by the switch. Thus, the originating switch that services a subscriber's line is usually the first network element of the AIN 100 to process communications originating on the subscriber's line. The originating switch receives a communication originating on the subscriber line and implements further processing, such as routing the communication for connection with a terminating destination. For example, an SSP 41 may receive a communication from an originating station, such as telephone 8a, on a subscriber line 18a and route the communication for connection with a terminating destination 7a in accordance with the packet-switched protocol of the PSTN. The details of communication routing are familiar to those skilled in the art.

The switches of the AIN 100 are interconnected by a network of voice channel lines known as "trunks" designated as 140 in FIG. 1. Trunks are the voice channel circuits that interconnect the central office switches to connect voice-channel communications. The term "communication" includes all messages or communications that may be exchanged between two pieces of terminating equipment. In FIG. 1, the terminating equipment is represented by telephones that are commonly designated as 7 and 8. Although the terminating equipment is illustrated as telephones, those skilled in the art will understand that terminating equipment may include other communication devices, such as wireless telephones, facsimile machines, computers, modems, etc.

Each piece of terminating equipment in the PSTN is preferably assigned a directory number. The term "directory number" is used herein in a manner consistent with its generally understood meaning of a number that is dialed or input by an calling party at an originating station to reach a terminating destination associated with the directory number. A directory number, typically a seven or ten-digit number, is commonly referred to as a "telephone number" and may be assigned to a specific telephone line, such as the telephone line 18a shown in FIG. 1.

It should also be noted that FIG. 1 illustrates a conventional landline telecommunications system, in which each subscriber is associated with a unique subscriber line, such as the subscriber line 18a. For simplicity, an exemplary embodiment of the present invention is described in the context of the conventional landline telecommunications system illustrated by FIG. 1. It should be understood, however, that alternative embodiments of the present invention might operate in association with cellular or other wireless telecommunications systems.

Routing a communication from the originating station 8a to the terminating destination 7a involves the selection of a routing path for the communication and may also involve the implementation of one or more advanced network functions, such as call forwarding, calling party identification, prepaid or debit-card communication services, and the like. The ability of a typical SSP to provide these advanced network functions, however, is limited due to physical and other constraints. The AIN 100 therefore provides for increased information processing capability through a system of intelligent network elements that are functionally connected with the SSPs through a network of data links that are commonly designated as 110 in FIG. 1.

These intelligent network elements of the AIN 100 can communicate with each other, and with the SSPs of the network, via digital data messages transmitted over the network of digital data links 110. An SSP may be configured to interface with these intelligent network elements through the use of a "trigger." In general, a trigger serves as an indicator for the SSP to take certain action. The SSP is configured so that, when the SSP detects a predetermined set of conditions defining the trigger in association with a communication, the SSP creates an appropriate digital data message for transmission over the network of digital data links 110. The SSP may also suspend routing of the communication (i.e., hold the communication) until the SSP receives a reply to its message from an appropriate network element (via the network of digital data links 110) instructing the SSP to take a certain action. If the SSP receives no instructions within a certain amount of time, the SSP may "time-out" and execute a default task for the communication.

The message created by an SSP in response to a trigger is known as a "query" message. A query message opens a "transaction" and the SSP generally holds the communication while the transaction remains open. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating destination. A trigger is typically activated or deactivated at an SSP by another network element through an "update" message. Query messages, conversation messages, response messages, and update messages are standard types of messages defined by the AIN protocol. The details of the AIN protocol are well known to those skilled in the art.

For the exemplary embodiments of the present invention, the originating switch 41 is preferably an SSP. It is noted, however, that the AIN 100 may also include non-SSP central office switches (not shown). It will be appreciated that a non-SSP switch may initially receive a communication on a subscriber line and pass the communication to another switch, such as SSP 41, for further processing. Similarly, in a cellular or wireless network, a mobile telecommunications switching office ("MTSO") or other receiver/transmitter may initially receive a communication from a cellular telephone or wireless unit and route the communication to another network element, such as SSP 41, for further processing. In this manner, advanced network functions available through the AIN 100 may be provided to wireless units and to subscriber lines that are directly connected to non-SSP switches.

Each switch in the AIN 100 is connected to a signal transfer point (STP) via a data link. This arrangement is represented in FIG. 1 by the originating switch 41, which is connected to a STP 30 via a data link 110a. The STP 30 is a multi-port, high-speed packet switch that is programmed to respond to the routing information in the SS7 protocol and route the packet to its destination. Digital data messages flowing between the SCP 20 and the SSPs 40 and 41 go through STP 30. Thus, the STP 30 is not normally the destination of a message, but merely directs traffic among the other entities on the network that generate and respond to the data messages.

Much of the intelligence of the AIN 100 resides in a plurality of service control points ("SCPs") represented by an SCP 20, which is connected to the STP 30 by an SS7 data link 110c. An SCP, such as the SCP 20, is a remotely programmable intelligent network element. As is known to those skilled in the art, SCPs are physically implemented by relatively powerful fault tolerant computers. Among the functions performed by SCPs is the maintenance of network databases, such as database 60, which is used in providing subscribers with advanced network functions.

Additional devices for implementing advanced network functions within the AIN 100 are provided by a service management system ("SMS") 10. The SMS 10 is connected via a data link 110d to the SCP 20. The SMS 10 provides a centralized platform for remotely programming the SCP 20 so that a coordinated information-processing scheme may be implemented for the AIN 100. The SMS 10 is implemented by a large general-purpose computer and interfaces to business offices of the local exchange carrier and inter-exchange carriers. The functions of the SMS 10 include: (a) downloading information to the database 60 when new subscribers are added or when subscribers modify their ensemble of services; (b) performing data reloads when the SCP 20 crashes or when software needs to be updated; (c) implementing high volume routing services, such as call forwarding and 800 number translation and routing; (d) maintaining and providing access to high volume databases for the authorization of billing, such as credit card number validations; and (e) downloading, on a non-real-time basis, billing information that is needed in order to appropriately invoice telephone company subscribers for the services provided.

As illustrated in FIG. 1, the AIN 100 also includes a service node ("SN") 50, which may also be referred to as a service circuit node ("SCN"). The SN 50 includes voice and dual tone multi-frequency ("DTMF") signal recognition devices and voice synthesis devices. The SN 50 communicates with the SCP 20 via a data link 110e using X.25 or TCP/IP protocols, and to the SMS 10 via a data link 110f. In addition, the SN 50 typically is connected to one or more (but usually only a few) SSPs via Integrated Service Digital Network ("ISDN") links, as shown by the connection 151 to the SSP 40. A more extensive description of non-call associated signaling is provided in Koster, U.S. Pat. No. 5,499,600, which is expressly incorporated by reference.

The AIN 100 thus provides subscribers with a selectable menu of advanced network functions. These advanced network functions are typically sold on a per-service basis, or in groups of services known as calling plans. Each subscriber may select a set of advanced network functions, or a calling plan that suits the subscriber's needs. Moreover, each subscriber may generally select among a plurality of local advanced network functions, as well as select among a plurality of long distance advanced network functions.

One such advanced network function is the universal number service, which is an embodiment of the present invention. When a subscriber initiates the universal number service, certain information is collected from the subscriber and maintained in a SCP database, such as database 60. In one embodiment of the present invention, that information may include a list of alternate destinations and their corresponding routing information. An alternate destination comprises a communication device such as a landline or cellular telephone, pager, facsimile machine, or other media. The corresponding routing information comprises the directory number generally associated with the communication device. Thus, alternate destinations may be accessed without using the universal number service by dialing that directory number directly.

In another embodiment of the invention, personal identification numbers, or PINs, may also be stored on database 60. The subscriber may use PINs to personalize, or customize, the list of alternate destinations that will be presented to a caller using that PIN. Thus, the subscriber may activate and deactivate PINs to create distinct lists of alternate destinations. In addition, the subscriber may modify the list of alternate destinations without the use of PINs by merely adding and deleting alternate destinations.

It should be noted that the preferred operating environment of the universal number service is not limited to the relatively simple configuration shown in FIG. 1. Rather, FIG. 1 shows an illustrative portion of the PSTN sufficient to describe the exemplary embodiments of the invention. Many other network elements and interconnections, including SSP, non-SSP, MTSO switches for servicing other pieces of terminating equipment are not shown in FIG. 1, but will be understood to be appropriate for use with the present invention.

Routing a Call Based Using the Universal Number Service

Figure 2:
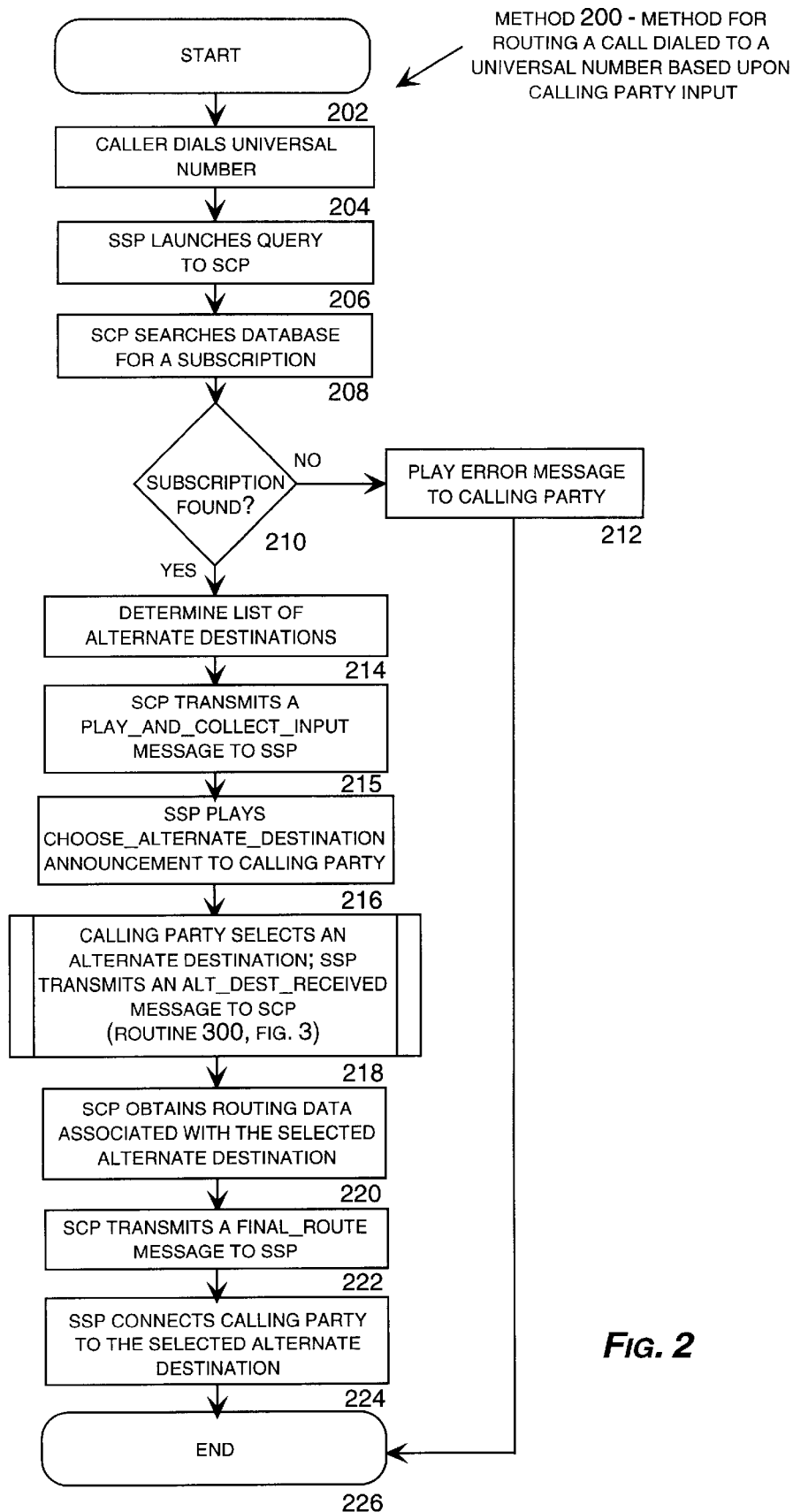
FIG. 2 is a flow diagram showing an illustrative method for routing a call using the universal number service, in accordance with an embodiment of the present information.

Referring now to FIGS. 1 and 2, embodiments of an illustrative method 200 for a universal number service will be described. The universal number service comprises routing a call, dialed to a universal number, to an alternate destination associated with a subscriber of the universal number service. The call is routed according to the caller's selection of one of the alternate destinations.

Method 200 begins at step 204, where a calling party dials a universal number from a telephone, such as telephone 8a. In one embodiment of the present invention, the universal number may comprise a public feature code accompanied by a standard seven or ten digit directory number. The public feature code, which is well known to those skilled in the art, typically begins with a "*" and is used to activate a particular feature on a telephone system, such as the universal number service. The seven or ten digit directory number is typically the primary number associated with the subscriber of the universal number service. For example, if the public feature code is "*49" and the subscriber is identified by the number "4045558888", then the universal number comprises "*49 4045558888".

Those skilled in the art should appreciate that alternative methods may be used to access the universal number service such as an 800 number. Use of a public feature code or an 800 number to access the universal number service allows a subscriber to use the subscriber's existing directory number. In addition, those skilled in the art should also appreciate that a dialing prefix, such as a public feature code or an 800 number, is not required to implement the universal number service. However, if a dialing prefix is not used, then a query is performed for each incoming call to determine whether the universal number service is activated rather than performing the query on a demand basis.

From step 204, method 200 proceeds to step 206, whereupon the SSP 41 determines that call routing instructions are needed and launches a query to the SCP 20. In one embodiment of the present invention, the SSP 41 recognizes that the call contains a public feature code which triggers a PUBLIC_FEATURE_QUERY to be sent from the SSP 41 to the SCP 20 via STP 30. The PUBLIC_FEATURE_QUERY comprises the public feature code and directory number, which is sent to the SCP 20 in order to determine how to handle the call.

Method 200 then continues to step 208, where the SCP 20 receives the query from the SCP 20 and searches database 60 for a valid subscription number associated with the dialed directory number and public feature code. In one embodiment of the present invention, a valid subscription number comprises the dialed directory number. Method 200 continues to decision block 210, where the SCP 20 determines whether a valid subscription number was found in database 60. If the public feature code does not correspond to the universal number service or if the subscriber has not initiated a subscription to the service, then method 200 branches to step 212.

At step 212, the SCP 20 instructs the SSP 41 to continue by routing the call to the dialed directory number. In other words, the call proceeds as if the public feature code was not dialed. In an alternative embodiment of the invention, the SCP 20 transmits a response message to the SSP 41 instructing it to play an error message back to the caller. The error message may comprise information indicating that the subscriber associated with the dialed number has not subscribed to the universal number service. The method 200 then proceeds from step 212 to step 226, where it ends.

On the other hand, if, at decision block 210, it is determined that the called party has initiated the universal number service, then method 200 continues to step 214. At step 214, the SCP 20 determines a list of alternate destinations to relay to the calling party. As described above, when a subscriber initiates the universal number service, certain information is collected from the subscriber and maintained in database 60. In one embodiment of the present invention, the collected information comprises the alternate destinations and the corresponding routing information. It is also noted that the subscriber may readily modify the list of alternate destinations after the initial subscription to the universal number service.

In another embodiment of the invention, the alternate destinations and routing information may also include corresponding personal identification numbers ("PINs"). The subscriber may use PINs to create personalized lists of alternate destinations corresponding to each PIN. Personalized lists are especially advantageous for a subscriber who wishes to differentiate calling parties and their access to the quantity and type of alternate destinations. For example, a subscriber having multiple business and personal numbers may employ a "business" PIN to limit certain business associates to choose from only non-personal lines. Those skilled in the art should appreciate that alternate PINs may be used to create other lists of alternate destinations based on the subscriber's preferences.

Thus, in accordance with one embodiment of the present invention, the SCP 20 may request a PIN from the calling party before determining the list of alternate destinations. The SCP 20 then determines the appropriate list of alternate destinations by determining which alternate destinations correspond with the received PIN. If the caller enters an invalid PIN (i.e., a PIN not authorized by the subscriber) the SCP 20 may relay a list of default alternate destinations to the calling party.

Referring back to FIG. 2, after determining the list of alternate destinations, method 200 proceeds from step 214 to step 215. At step 215, the SCP 20 transmits a PLAY_AND_COLLECT_INPUT conversation message back to the SSP 41 instructing it to play an ALTERNATE_DESTINATION announcement and receive the calling party's selection. In one embodiment of the present invention, the ALTERNATE_DESTINATION announcement comprises a list of alternate destinations associated with the dialed universal number. In another embodiment of the invention, the ALTERNATE_DESTINATION announcement comprises a list of alternate destinations associated with a received PIN and the dialed universal number.

From step 215, method 200 proceeds to step 216, where, in response to receiving the PLAY_AND_COLLECT_INPUT conversation message from the SCP 20, the SSP 41 plays the ALTERNATE_DESTINATION announcement back to the calling party. As described above, the ALTERNATE_DESTINATION announcement may comprise listing alternate destinations contained within database 60. For instance, the SSP 41 may play an announcement such as: "Press '1' for access to a pager; press '2' for access to a cellular telephone; press '3' for access to a primary business number; press '4' for access to a fax machine; press '5' for access to a primary residential number; press '6' for access to a modem number; press '7' for access to an alternate telephone number; press '8' for access to a voice-mail system; press '9' to access a secondary number; press '0' to access the subscriber's primary number." Those skilled in the art will appreciate that other destinations may be included as they are available.

As described above, the subscriber may register these and other alternate destinations after initiating a subscription agreement to the universal number service. In one embodiment of the present invention, the subscriber's primary number, which typically comprises the universal number without the public feature code, may be included in database 60 to provide the subscriber additional functionality. For instance, the subscriber may initiate multiple lines to the universal number service, such as the subscriber's primary line and cellular telephone. The multiple subscriptions may be linked together in database 60 to provide the subscriber a simple and uniform method of providing alternate destinations.

For example, in one embodiment of the present invention, a calling party may dial the universal number service public feature code plus the cellular telephone number and get routed to the subscriber's primary number by selecting "0." Alternatively, the caller may dial the universal number service public feature code plus the primary number and get routed to the subscriber's cellular telephone by selecting "2." Those skilled in the art will appreciate that other alternate destinations may be linked to the universal number service to provide similar functionality. Moreover, the subscriber may use the same PINs for each subscription to provide uniform lists of alternate destinations.

In another embodiment of the present invention, the subscriber may add "secondary numbers" as temporary alternate destinations. Temporary alternate destinations may include hotel room numbers or borrowed cellular telephones. For example, a subscriber traveling on an extended business trip may wish to allow callers to route calls directly to the subscriber's hotel room telephone. Thus, the subscriber may add the hotel room telephone number and/or hotel facsimile machine number as alternate destinations. In addition, the subscriber may use a temporary PIN to create a temporary list of alternate destinations comprising the hotel room telephone number and facsimile machine.

Referring back to FIG. 2, method 200 continues from step 216 to step 218, where the caller selects one of the alternate destinations which is then transmitted by an ALT_DEST_RECEIVED message to the SCP 20. Method 200 then proceeds to step 220, where the SCP 20 receives the ALT_DEST_RECEIVED message from the SSP 41. The SCP 20 then reads the database 60 entry corresponding to the input selected by the calling party to determine the directory number associated with the alternate destination. An illustrative method for routing a call to an alternate destination, wherein the alternate destination is a pager, is further described below with reference to FIG. 3.

From step 220, method 200 then continues to step 222 and step 224, where the call undergoes normal call processing. At step 222, the SCP 20 transmits a FINAL_ROUTE response message to the SSP 41, which instructs the SSP 41 to route the call to the selected destination. From step 222, method 200 continues to step 224, where the caller is connected to the selected alternate destination. From step 224, method 200 then proceeds to step 226, where it ends.

Figure 3:
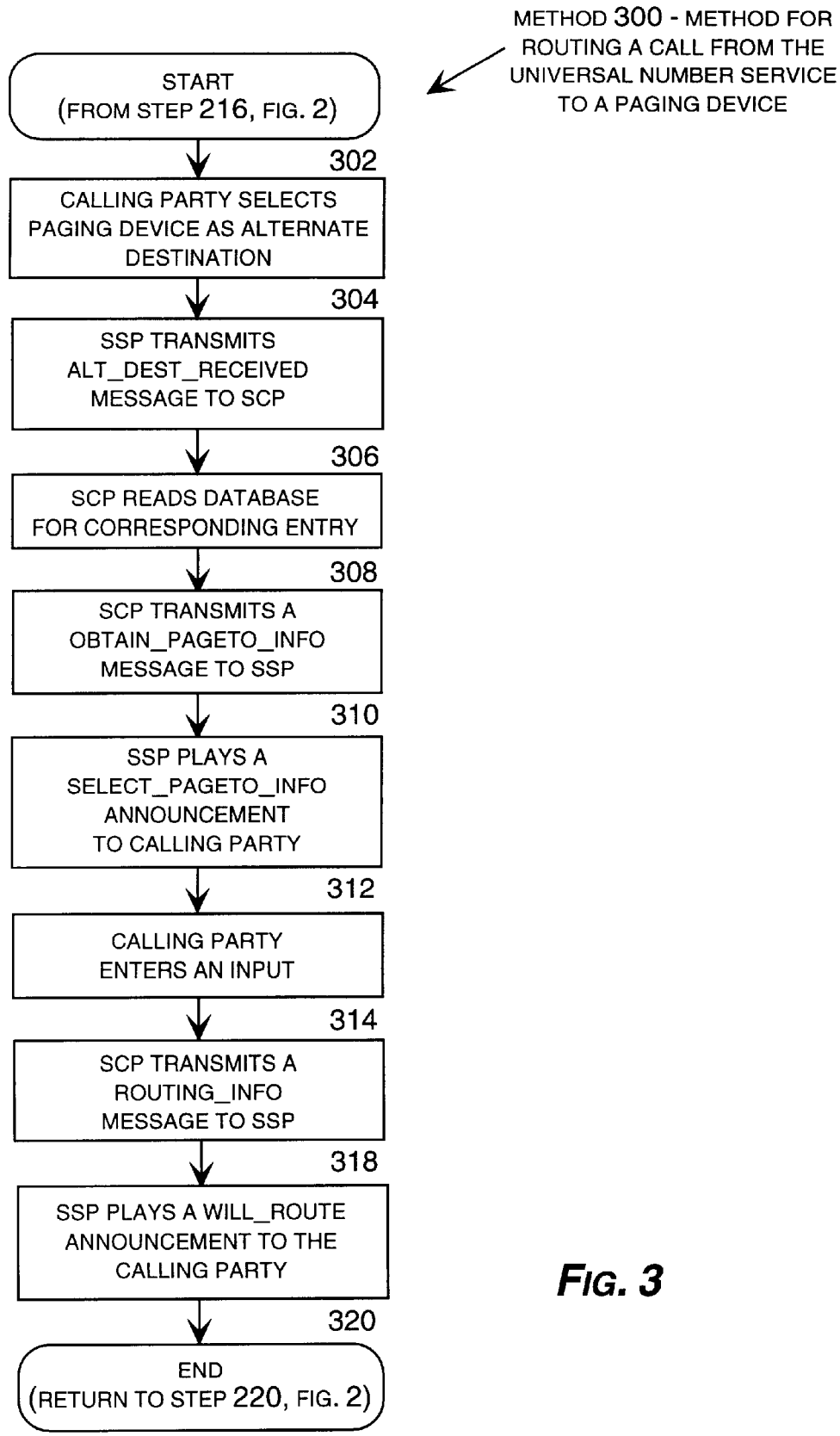
FIG. 3 is a flow diagram showing an illustrative method for routing a call using the universal number service to a subscriber's paging device, in accordance with an embodiment of the present information.

Referring now to FIGS. 1 and 3, an illustrative method 300 for routing a call from the universal number service to an automated termination device, such as a pager, will be described. Those skilled in the art will appreciate that, while the illustrative embodiment describes routing the call to a paging device, the call may be routed to any automated termination device. For the purposes of this description, automated termination devices are devices that do not require called party (i.e., subscriber) interaction, such as facsimile machines, voicemail, electronic mail, and the like.

Method 300 begins from step 304, where the caller selects the subscriber's pager from the list of alternate destinations. Method 300 continues to step 306, where in response to recognizing the caller's input, the SSP 41 sends the ALT_DEST_RECEIVED message back to SCP 20 with the input collected. Method 300 then continues from step 306 to step 308.

At step 308, the SCP 20 receives the ALT_DEST_RECEIVED message from the SSP 41 and reads the database 60 entry corresponding to the calling party's selection to determine the directory number associated with the alternate destination. Method 300 then continues to step 310, where the SCP 20 recognizes that the selected alternate destination is a paging device requiring further caller input. In response to recognizing that further caller input is necessary, the SCP 20 transmits an OBTAIN_PAGETO_INFO conversation message to the SSP 41 instructing it to obtain the number to which the caller wishes to be paged back ("page-to number"). Those skilled in the art will appreciate that other automated termination devices, such as facsimile machines and electronic mail devices, may also require additional queries to the calling party. For instance, a caller attempting to transmit an electronic mail message to a subscriber may be queried to obtain the message.

Method 300 then proceeds to step 312, where, in one embodiment of the present invention, the SSP 41 plays a SELECT_PAGETO_INFO announcement instructing the caller to enter a page-to number. In another embodiment of the invention, the SELECT_PAGETO_INFO announcement may comprise a query of whether the caller wishes to be paged back to the number the party is calling from ("page-back number"). From step 312, method 300 continues to step 314.

At step 314, the calling party enters an input, such as the page-to number, that is then transmitted to the SCP 20. Those skilled in the art will appreciate that the present invention can be used in connection with digital pagers, which may provide the added functionality of receiving text information. A subscriber having a digital pager as an alternate destination may choose an option that instructs the SCP 20 to collect additional information from the calling party. If the subscriber chooses to collect additional information from the calling party, then an indication of the type of information to collect as well as the method(s) to collect the information are indicated in database 60. Thus, the calling party may be requested to enter a statement or other information along with the page-to information.

The caller may then enter the statement and/or page-to information in any manner known to those skilled in the art. For example, in one embodiment of the present invention, the caller may enter the input via a standard keypad found on most commercial telephones. In another embodiment of the invention, the input may be obtained via speech and voice recognition. The reader should appreciate that the present invention may be used in like manner to transmit statements to other termination devices, such as electronic mail devices and facsimile machines.

Referring back to FIGS. 1 and 3, from step 314, method 300 then proceeds to step 318, where the SCP 20 transmits a ROUTING_INFO response message to the SSP 41, instructing it to play an announcement informing the calling party that their requested page-to information, and/or statement will be sent to the subscriber's pager. In one embodiment of the present invention, the SCP 20 may also query a Calling Name Service ("CNAM") database to collect and transmit the caller's name and telephone number from which the caller is calling. CNAM databases, which are well known to those skilled in the art, provide a subscriber's name associated with a telephone number in response to a query of that telephone number.

From step 318, method 300 then proceeds to step 320, where the SSP 41 plays a WILL_ROUTE announcement containing the ROUTING_INFO message information to the caller. Method 300 then returns to step 220, FIG. 2, where that information is transmitted to the subscriber's paging device. In one embodiment of the present invention, the SCP 20 may utilize internet connectivity to send the information to the subscriber's digital pager. For example, the SCP 20 could determine the caller's name based on the page-back number and then communicate the name to the paging company that provides service to the subscriber's digital pager by sending a message to the paging company via the Internet.

Additional alternative embodiments will be apparent to those skilled in the art to which the present invention pertains without departing from its spirit and scope. Accordingly, the scope of the present invention is described by the appended claims and is supported by the foregoing description.

What is claimed is:

1. A method for routing a call directed to a universal number to alternate destination associated with a subscriber of the universal number, comprising:

receiving the call directed to the universal number from a calling party;

determining whether the universal number matches a valid subscription number to determine whether call routing options should be provided to the calling party;

in response to finding a match, providing a list of at least one alternate destination to the calling party;

receiving input from the calling party, wherein the input selects one of the alternate destinations; and routing the call to the selected alternate destination so that the call is routed based on the calling party's selection;

wherein the method further comprises allowing the subscriber to add at least one temporary alternate destination to the list of at least one alternate destination such that the call is routed to the temporary alternate destination by selecting the temporary alternate destination that is not originally set to the list of at least one alternate destination;

associating a personal identification number ("PIN") with said at least one alternate destination and providing said at least one alternate destination to said calling party upon said calling party supplying said PIN;

associating a temporary PIN with said temporary alternate destination and providing said temporary alternate destination to said calling party upon said calling party supplying said temporary PIN.

2. The method of claim 1, wherein the call directed to the universal number comprises a public feature code and a directory number.

3. The method of claim 1, wherein the call directed to the universal number comprises an 800 directory number and wherein the universal number is received from the calling party.

4. The method of claim 1, wherein the list of at least one alternate destination includes a number associated with an automated termination device.

5. The method of claim 4, wherein the automated termination device is an electronic mail device.

6. The method of claim 4, wherein the automated termination device is a facsimile machine.

7. The method of claim 4, further comprising obtaining a statement from the calling party before routing the call to the selected alternate destination.

8. The method of claim 4, wherein the automated termination device is a pager.

9. The method of claim 8, further comprising determining a page-to number for the calling party before routing the call to the selected alternate destination.

10. The method of claim 9, wherein the page-to number is received directly from the calling party.

11. The method of claim 9, wherein the page-to number is the number the calling party is calling from.

12. The method of claim 9, wherein routing the call to the destination uses internet connectivity to transmit a statement, the calling party's name, and the calling party's page-to number.

13. A method for using a universal number to connect to an alternate destination associated with a subscriber of the universal number, comprising:

dialing a universal number to obtain call routing options for a calling party;

entering a personal identification number ("PIN") associated with the calling party, the PIN being associated with a predetermined list of at least one alternate destination provided by the subscriber, and calling parties entering the same PIN being provided with the same predetermined list of at least one alternate destination;

entering a temporary personal identification number ("PIN") associated with the calling party, the temporary PIN being associated with a predetermined list of at least one temporary alternate destination provided by the subscriber, and calling parties entering the same temporary PIN being provided with the same predetermined list of at least one temporary alternate destination;

receiving a message comprising the list of at least one alternate destination or the list of at least one temporary alternate destination; and selecting one alternate destination or one temporary alternate destination from the list of at least one alternate destination or the list of at least one temporary alternate destination, so that the calling party is connected to an alternate number that corresponds to the alternate destination or a temporary alternate number that corresponds to the temporary alternate destination.

14. The method of claim 13, wherein the universal number comprises a public feature code and a directory number.

15. The method of claim 13, wherein the list of at least one alternate destination includes a number associated with an automated termination device.

16. The method of claim 13, further comprising:

receiving a message requesting additional information from the calling party; and providing the requested information so that the information is provided to an automated termination device at the selected alternate destination.

17. A system for routing a call dialed to a universal number to an alternate destination associated with a subscriber of the universal number comprising:

a service switching point ("SSP") for receiving the call from the calling party and, in response to receiving the call, querying a service control point ("SCP") for call routing instructions; receiving from the SCP a list of alternate destinations provided by the subscriber and playing the list of alternate destinations to the calling party; receiving an input from the calling party to select one alternate destination from the list of alternate destinations and transmitting the input to the SCP; and in response to receiving call routing instructions from the SCP, routing the call to the selected alternate destination;

the SCP for maintaining a database and, in response to receiving the query from the SSP, checking the database to determine whether the universal number matches the valid subscription number to determine whether call routing options should be provided to the calling party, if the universal number matches the valid subscription number, then accessing the database to obtain the list of alternate destinations corresponding to the universal number and providing the list of alternate destinations to the SSP; and in response to receiving the calling party's input, formulating a response message that includes the call routing instructions; and the database maintained by SCP for storing the universal number, the list of alternate destinations associated with the universal number, and the routing information corresponding to each alternate destination;

wherein the SCP further stores a temporary alternate destination as one of the alternate destinations in the database, in response to a request of the subscriber such that the call is routed to the temporary alternate destination by selecting the temporary alternate destination that is not originally set as the alternate destinations;

wherein the SCP further stores a temporary PIN associated with the temporary alternate destination, the SCP routing a caller to the temporary alternate destination upon receiving the temporary PIN.

18. The system of claim 17, wherein the universal number comprises a public feature code and a directory number.

19. The system of claim 17, wherein the list of at least one alternate destination includes a number associated with an automated termination device.

* * * * *